United States Patent
Mizon et al.

(12)

(10) Patent No.: US 6,499,549 B2
(45) Date of Patent: Dec. 31, 2002

(54) DRIVE AXLE FOR HYBRID VEHICLE

(75) Inventors: Richard Mizon, Fayetteville, NY (US); Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/082,572

(22) Filed: Feb. 25, 2002

(65) Prior Publication Data

US 2002/0129980 A1 Sep. 19, 2002

Related U.S. Application Data

(62) Division of application No. 09/808,623, filed on Mar. 14, 2001, now Pat. No. 6,378,638.

(51) Int. Cl.[7] .................................................. B60K 1/00
(52) U.S. Cl. ..................... 180/65.6; 180/65.2; 475/150; 475/221; 475/342
(58) Field of Search ............................... 180/65.2, 65.3, 180/65.4, 65.5, 65.6, 65.7, 65.8, 65.1, 233; 475/149, 150, 221, 342, 248

(56) References Cited

U.S. PATENT DOCUMENTS

| | | | |
|---|---|---|---|
| 5,062,824 A | | 11/1991 | Prokopius |
| 5,443,130 A | * | 8/1995 | Tanaka et al. ............. 180/65.6 |
| 5,513,719 A | | 5/1996 | Moroto et al. |
| 5,620,387 A | | 4/1997 | Janiszewski |
| 5,718,300 A | | 2/1998 | Frost |
| 5,845,732 A | | 12/1998 | Taniguchi et al. |
| 5,919,109 A | * | 7/1999 | Fleckenstein |
| 5,943,918 A | | 8/1999 | Reed et al. |
| 6,019,698 A | | 2/2000 | Lawrie et al. |
| 6,041,877 A | | 3/2000 | Yamada et al. |
| 6,059,064 A | | 5/2000 | Nagano et al. |
| 6,059,684 A | | 5/2000 | Susaki et al. |
| 6,083,138 A | | 7/2000 | Aoyama et al. |
| 6,119,799 A | | 9/2000 | Morisawa et al. |
| 6,170,587 B1 | | 1/2001 | Bullock |
| 6,358,176 B1 | * | 3/2002 | Nauheimer et al. .......... 475/149 |
| 6,378,638 B1 | * | 4/2002 | Mizon et al. ............... 180/65.6 |
| 6,398,685 B1 | * | 6/2002 | Wachauer et al. .......... 475/149 |
| 6,401,850 B1 | * | 6/2002 | Bowen ....................... 180/65.6 |

\* cited by examiner

Primary Examiner—Brian L. Johnson
Assistant Examiner—Bryan Fischmann
(74) Attorney, Agent, or Firm—Harness, Dickey & Pierce P.L.C.

(57) ABSTRACT

An electric drive axle for use in hybrid vehicles has an electric motor driving a compact gearbox. The gearbox includes a planetary reduction unit and a differential assembly. The planetary reduction unit has a sun gear driven by the electric motor, and compound planet gears supported from a planet carrier which have a first gear segment meshed with a fixed first ring gear and a second gear segment meshed with a second ring gear. The sun gear is also meshed with one of the first and second gear segments of the compound planet gears. The second ring gear drives the differential which transfer motive power to a pair of output shafts adapted for connection to one set of wheels. When used with a conventional engine-based powertrain for the other set of wheels, the electric drive axle establishes a four-wheel drive powertrain for the hybrid vehicle. The electric motor and gearbox are mounted in a common housing assembly to provide a compact drive axle assembly.

27 Claims, 7 Drawing Sheets

US 6,499,549 B2

DRIVE AXLE FOR HYBRID VEHICLE

CROSS REFERENCE TO RELATED APPLICATION

This application is a divisional of U.S. application Ser. No. 09/808623 filed Mar. 14, 2001 now U.S. Pat. No. 6,378,638 and entitled "Drive Axle For Hybrid Vehicle", which application is herein expressly incorporated by reference.

FIELD OF THE INVENTION

The present invention relates to hybrid drive systems for motor vehicles. More specifically, the present invention relates to an integrated electric motor and axle assembly for use in hybrid motor vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid powertrains have also been adapted for use in four-wheel drive vehicles and typically utilize the above-noted parallel hybrid powertrain to drive the primary wheels and a second electric motor to drive the secondary wheels. Obviously, such a four-wheel drive system is extremely expensive and difficult to package. Thus, a need exists to develop hybrid powertrains for use in four-wheel drive vehicles that utilize many conventional powertrain components so as to minimize specialized packaging and reduce cost.

SUMMARY OF THE INVENTION

It is an object of the present invention to provide a hybrid powertrain drive system for a four-wheel drive vehicle.

It is another object of the present invention to provide an integrated gearbox and electric motor assembly for use as an electric drive motor axle in a hybrid vehicle.

As a related object, the hybrid drive system of the present invention utilizes an internal combustion engine as a first drive source to supply motive power to a first set of wheels and further uses the electric drive motor axle as a second drive source to supply motive power to a second set of wheels. A control system functions to control operation of the first and second drive sources either independently or in combination was dictated by the current vehicle operating conditions.

These and other objects are provided by an electrically-powered drive axle adapted for use in hybrid vehicles and having an electric motor and a gearbox packaged within a common housing assembly. The gearbox includes a differential assembly driven by a planetary-type reduction unit. The reduction unit includes a sun gear driven by the motor, a first ring gear fixed to the housing assembly, a second ring gear, and compound planet gears rotatably supported from a planet carrier. Each compound planet gear has a first gear segment that is meshed with the first ring gear and a second gear segment that is meshed with the sun gear and the second ring gear. As such, the second ring gear is driven at a reduced speed relative to the sun gear and acts as the input to the differential assembly.

In accordance with one aspect of the present invention, the differential assembly is a bevel-type unit having the second ring gear driving a differential case which rotatably supports pinions that are meshed with first and second side gears. The side gears are fixed to corresponding first and second output shafts that are adapted for connection to a pair of wheels. Alternatively, the differential assembly can be a planetary-type unit wherein the second ring gear drives a third ring gear which, in turn, drives meshed sets of first and second pinion gears. The first and second pinion gears are rotatably supported from a pinion carrier which is fixed for rotation with a first output shaft. The meshed sets of first and second pinion gears drive second sun gear which is fixed for rotation with a second output shaft.

In accordance with an alternative aspect of the present invention, the reduction unit can be arranged to eliminate the sun gear and have the planet carrier driven by the motor.

Further areas of applicability of the present invention will become apparent from the detailed description provided hereinafter. However, it should be understood that the detailed description and specific examples, while indicating preferred embodiments of the present invention, are intended for purposes of illustration only since various changes and modifications within the fair scope of this particular invention will become apparent to those skilled in the art.

DETAILED DESCRIPTION OF THE PREFERRED EMBODIMENTS

The present invention is related to an integrated gearbox and electric motor asssembly, hereinafter referred to as an electric drive motor axle, which functions as an electrically-controlled transaxle in a hybrid motor vehicle for delivering motive power (i.e., drive torque) to a pair of ground-engaging wheels. The compact arrangement of the electric motor and gearbox in a common housing permits the use of the electric drive motor axle in substitution for a conventional axle assembly. As such, conventional rear-wheel drive and front-wheel drive powertrains can be used in combination with the electric drive motor axle so as to establish a hybrid drive system for a four-wheel drive motor vehicle. Accordingly, various features and functional characteristics of the electric drive motor axle will be set forth below in a manner permitting those skilled in relevant arts to fully comprehend and appreciate the significant advantages the present invention provides, particularly when used in four-wheel drive hybrid vehicles.

Figure 1:
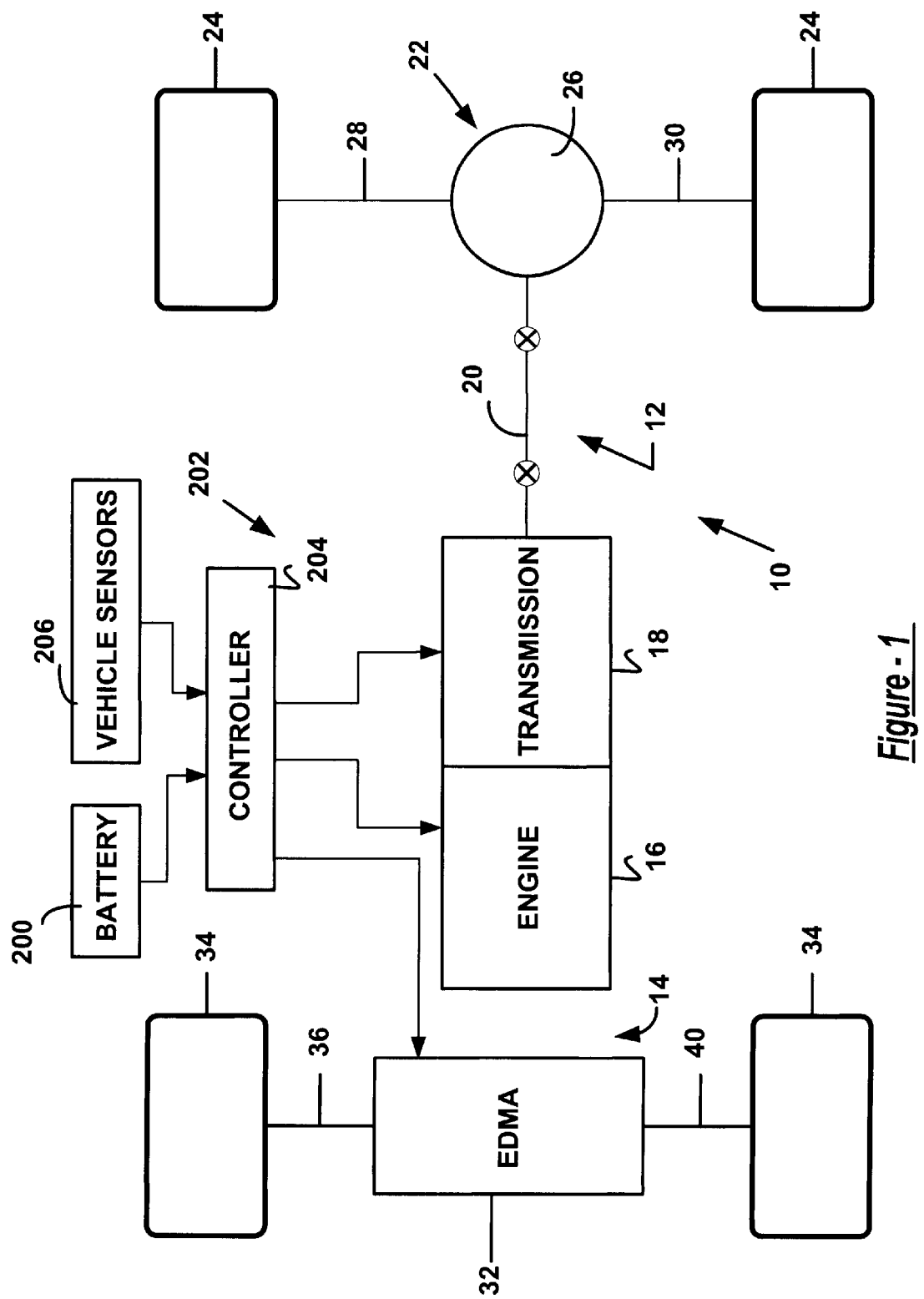
FIG. 1 is a schematic view showing a hybrid powertrain for a four-wheel drive vehicle in accordance with the present invention.

Referring to FIG. 1, a four-wheel drive powertrain for a hybrid electric vehicle 10 is shown to include a first powered driveline 12 and a second powered driveline 14. First powered driveline 12 includes an internal combustion engine 16, a transmission 18, a drive shaft 20, and an axle assembly 22 connecting a pair of wheels 24. Engine power is delivered to a differential unit 26 associated with axle assembly 22 through transmission 18 and drive shaft 20. The drive torque delivered to differential unit 26 is transferred through axleshafts 28 and 30 to wheels 24. Second powered driveline 14 includes an electric drive motor axle (EDMA) 32 which drives a second pair of wheels 34 through axleshafts 36 and 40.

Figure 2:
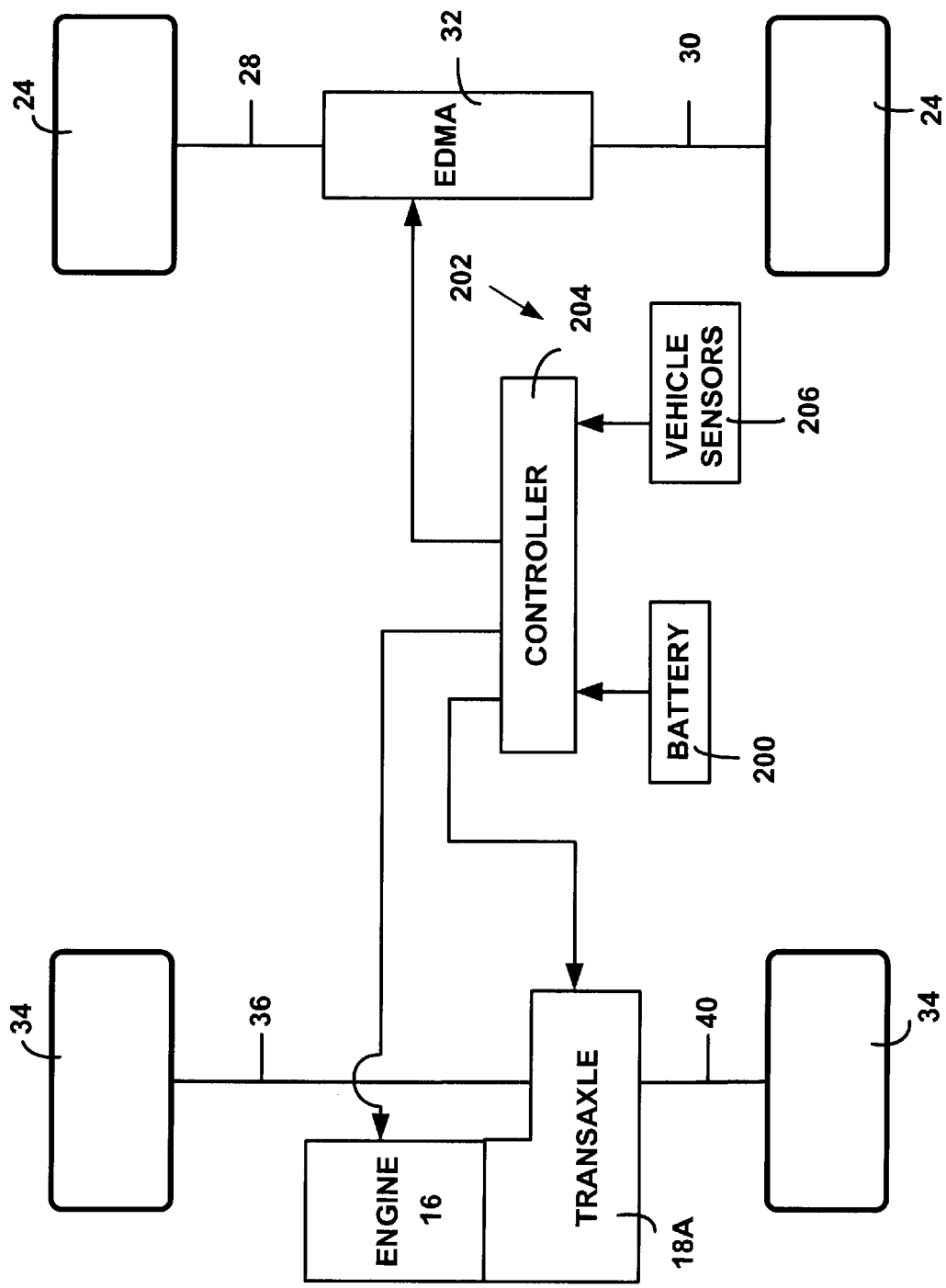
FIG. 2 is a schematic view of an alternative arrangement for the hybrid powertrain of the present invention.

In the particular layout shown in FIG. 1, first powered driveline 12 delivers power to rear wheels 24 while second powered driveline 14 delivers power to front wheels 34. Obviously, those skilled in the art would understand that the opposite powertrain arrangement can be utilized such that EDMA 32 supplies power to the rear wheels. To better illustrate this arrangment, FIG. 2 shows EDMA 32 supplying power to rear wheels 24 through axleshafts 28 and 30 while engine power is supplied to front wheels 34 through a transaxle 18A and axleshafts 36 and 40. Regardless of the particular arrangement, hybrid vehicle 10 includes two distinct powered drivelines capable of both independent and combined operation to drive the vehicle.

Figure 3:
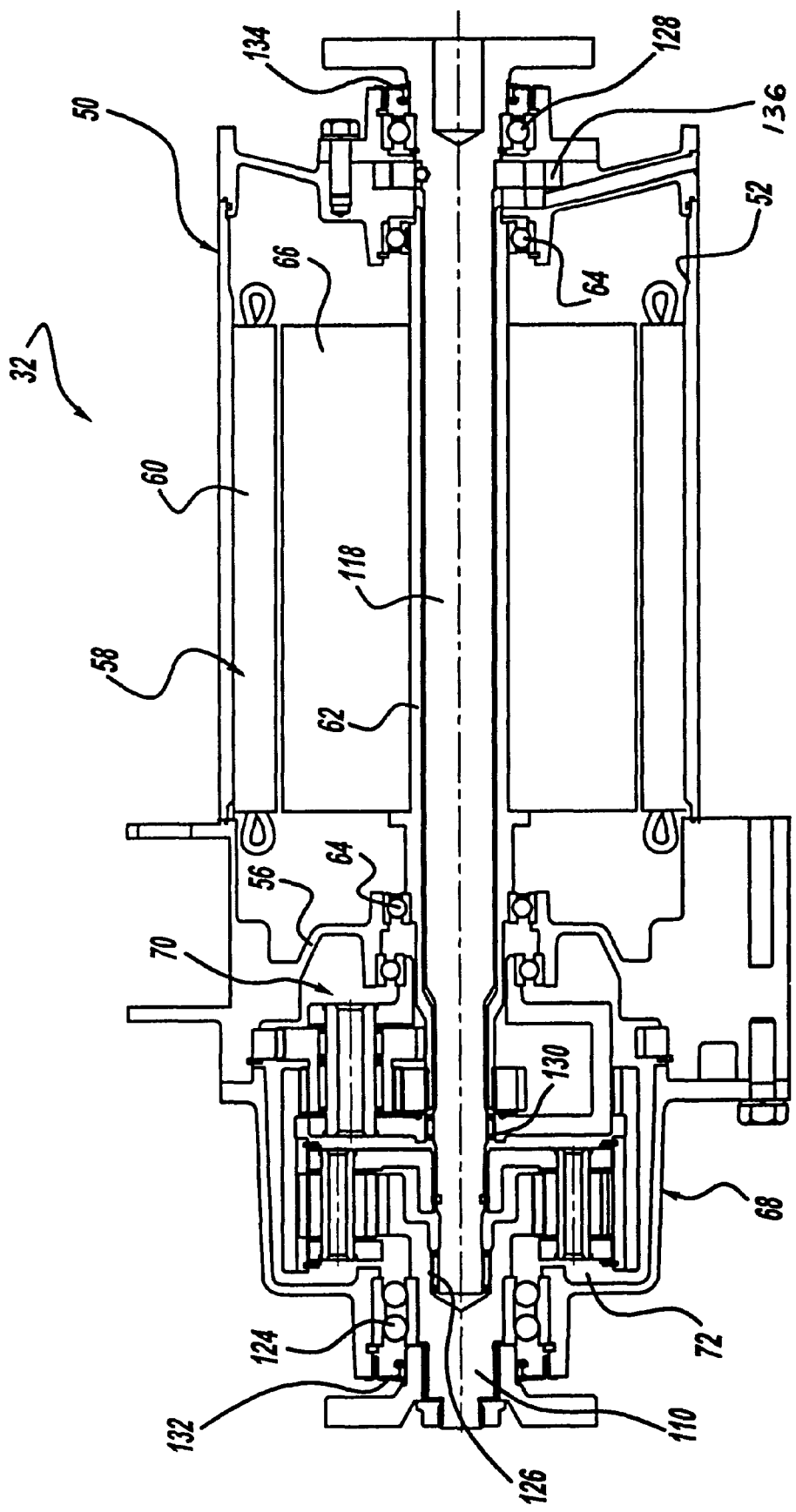
FIG. 3 is a sectional view of an electric drive motor axle associated with the hybrid powertrains of FIGS. 1 and 2.
Figure 4:
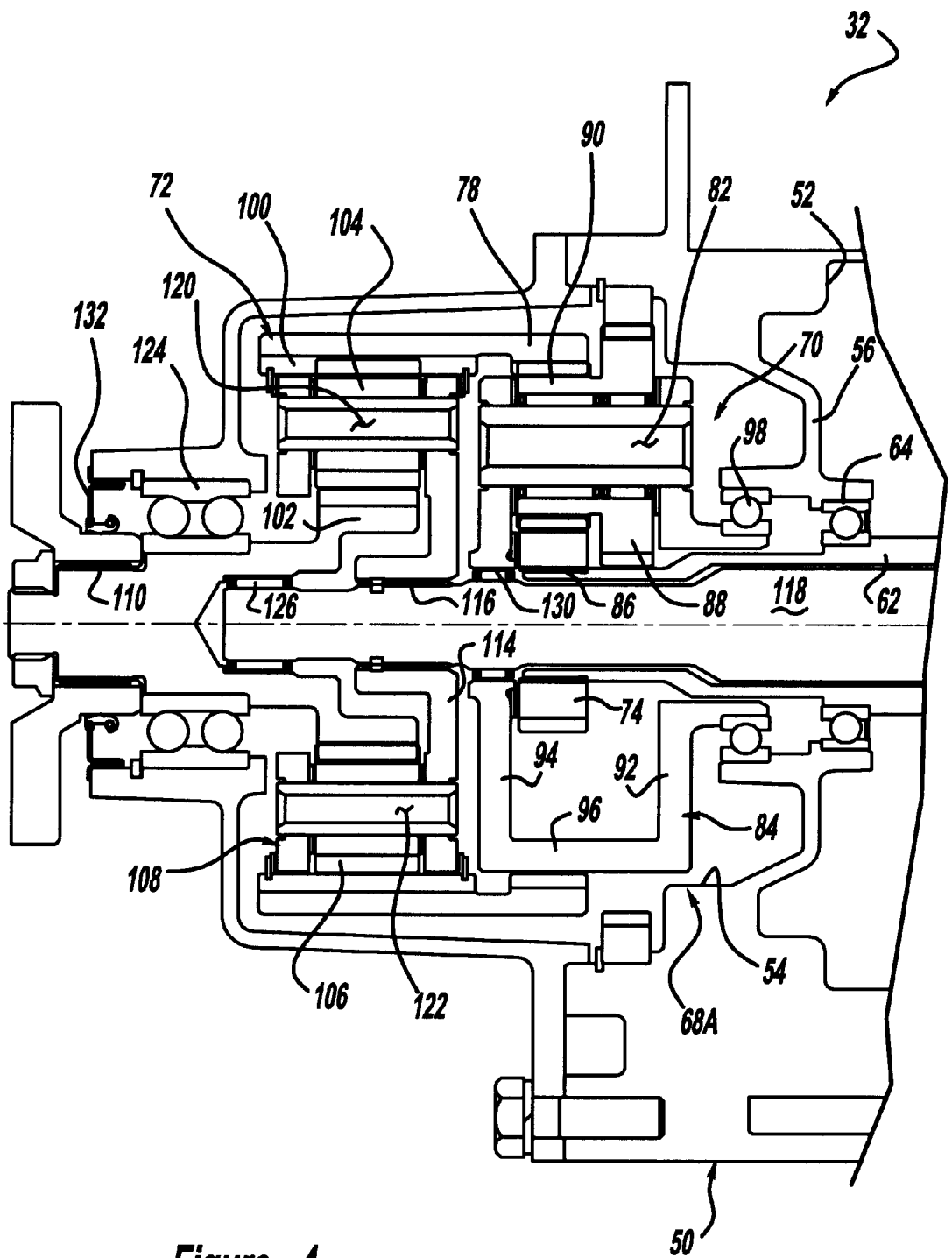
FIG. 4 is an enlarged portion of FIG. 3 showing the components associated with the gearbox of the electric drive motor axle in greater detail.

Referring now to FIGS. 3 and 4, a first preferred embodiment of EDMA 32 will be described in detail. EDMA 32 includes a multi-section housing assembly 50 defining a motor chamber 52 and a gearbox chamber 54 separated by a radial support wall 56. An electric variable speed motor assembly 58 is located within motor chamber 52 and includes a wound stator 60 secured to housing assembly 50 and an elongated tubular rotor shaft 62. Rotor shaft 62 is supported at its opposite ends by bearing assemblies 64 for rotation relative to housing assembly 50. Motor assembly 58 further includes a rotor 66 fixedly secured to motor shaft 62.

EDMA 32 further includes a gearbox 68 located within gearbox chamber 54 and which is comprised of a reduction unit 70 and a differential assembly 72. Reduction unit 70 is a planetary gearset including a sun gear 74, a first ring gear 76 fixed to housing assembly 50, a second ring gear 78, and a plurality of compound planet gears 80 rotatably supported on pins 82 that are mounted to a planet carrier 84. Sun gear 74 can be integrally formed at one end of rotor shaft 62 (as shown) Or, in the alternative, can be a tubular unit that is fixedly secured to rotor shaft 62. As best seen from FIG. 4, sun gear 74 is fixed via a spline connection 86 for rotation with rotor shaft 62. Each compound planet gear 80 includes a first gear segment 88 that is meshed with first ring gear 76 and a second gear segment 90 that is meshed with sun gear 74 and second ring gear 78. First and second gear segments 88 and 90 can be integrally formed or, in the alternative, can be defined by separate gears which are rigidly fixed together (i.e., welded) for common rotation. Planet carrier 84 is shown to include a first ring section 92 and a second ring section 94 integrally connected at a plurality of circumferential locations by lug sections 96. First ring section 92 is shown to be rotatably supported from housing assembly 50 by a bearing assembly 98.

With continued references to FIGS. 3 and 4, differential assembly 72 is shown to be a planetary gearset having a third ring gear 100, a second sun gear 102, and meshed pairs of first pinions 104 and second pinions 106 each rotatably supported from a pinion carrier 108. In particular, third ring gear 100 is formed on an axial extension of second ring gear 78 so as to rotate at a common speed therewith. Second sun gear 102 is shown to be integrally formed at one end of a first output shaft 110. Pinion carrier 108 includes a first carrier ring 112 interconnected to a second carrier ring 114 which, in turn, is fixed via a spline connection 116 to one end of a second output shaft 118. First pinions 104 are rotatably supported on pins 120 extending between carrier rings 112 and 114 and are meshed with third ring gear 100. Likewise, second pinions 106 are rotatably supported on pins 122 extending between carrier rings 112 and 114 and are meshed with second sun gear 102. As noted, pinions 104 and 106 are circumferentially arranged in meshed pairs around pinion carrier 108. As shown, a bearing assembly 124 supports first output shaft 110 from housing 50 while a piloted end of second output shaft 118 is supported from first output shaft 110 by a bearing assembly 126. The opposite end of second output shaft 118 is supported from housing 50 by bearing assembly 128. In addition, a bearing assembly 130 supports second ring section 94 of planet carrier 84 on second output shaft 118. Additionally, resilient end seals 132 and 134 are provided at opposite ends of EDMA 32. It is contemplated that a lube pump 136 could be provided to circulate lubricant with gearbox chamber 54. Lube pump 136 could be electric or shaft driven as required.

In accordance with a preferred use of EDMA 32, output shafts 110 and 118 are adapted to be connected to corresponding ones of front axleshafts 36 and 40 for the hybrid powertrain arrangement shown in FIG. 1 or, alternatively, to corresponding ones of rear axleshafts 28 and 30 for the powertrain arrangement shown in FIG. 2. In this manner, EDMA 32 functions as an electrically-powered secondary axle assembly which can be controlled independently, or in combination with, the engine-based powertrain. To provide a compact arrangement, second output shaft 118 is shown to extend through tubular rotor shaft 62 such that rotor shaft 62 is journalled on second output shaft 118.

In operation, rotation of rotor shaft 62 via actuation of electric motor assembly 58 causes concurrent rotation of sun gear 74. Since first ring gear 76 is held stationary, rotation of sun gear 74 causes compound planet gears 80 to rotate and drive planet carrier 84 at a reduced speed. Such rotation of planet carrier 84 cause rotation of second ring gear 78 at a further reduced speed. Obviously, the overall speed reduction ratio is established by the specific geometries of the meshing gears, but is preferred to be in the range of 10.0:1 to 15.0:1 for such hybrid motor vehicle applications. Since second ring gear 78 acts as the driven output of planetary reduction unit 70, it drives third ring gear 100 of differential assembly 72 at a common rotary speed. Power is then transferred through pinions 104 and 106 and is ultimately delivered to output shafts 110 and 118. Variable speed control of motor assembly 58 permits the torque delivered to the wheels to be continuously controlled.

Figure 5:
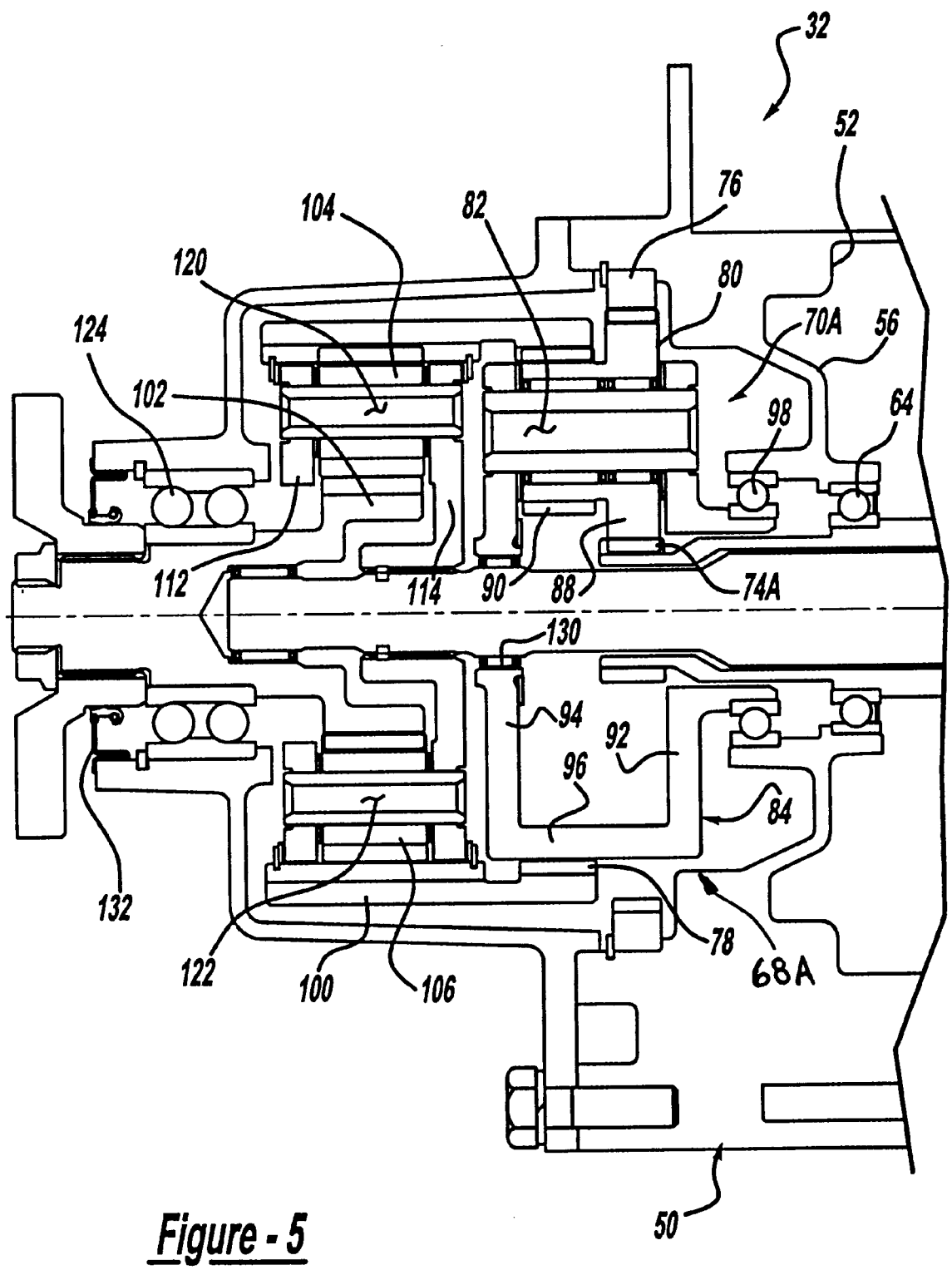
FIG. 5 is a partial sectional view showing an alternative embodiment of the gearbox adapted for use in the electric drive motor axle of the present invention.

Referring to FIG. 5, a modified reduction unit 70A in a gearbox 68A adapted for use with EDMA 32 is shown to be generally similar to gearbox 68 except that sun gear 74A is integrally formed with rotor shaft 62 and is meshed with first gear segment 88 of compound planet gears 80. As before, second ring gear 78 is driven by compound planet gears 80 and acts to drive third ring gear 100 for transferring drive torque through differential assembly 72 to output shafts 110 and 118.

Figure 6:
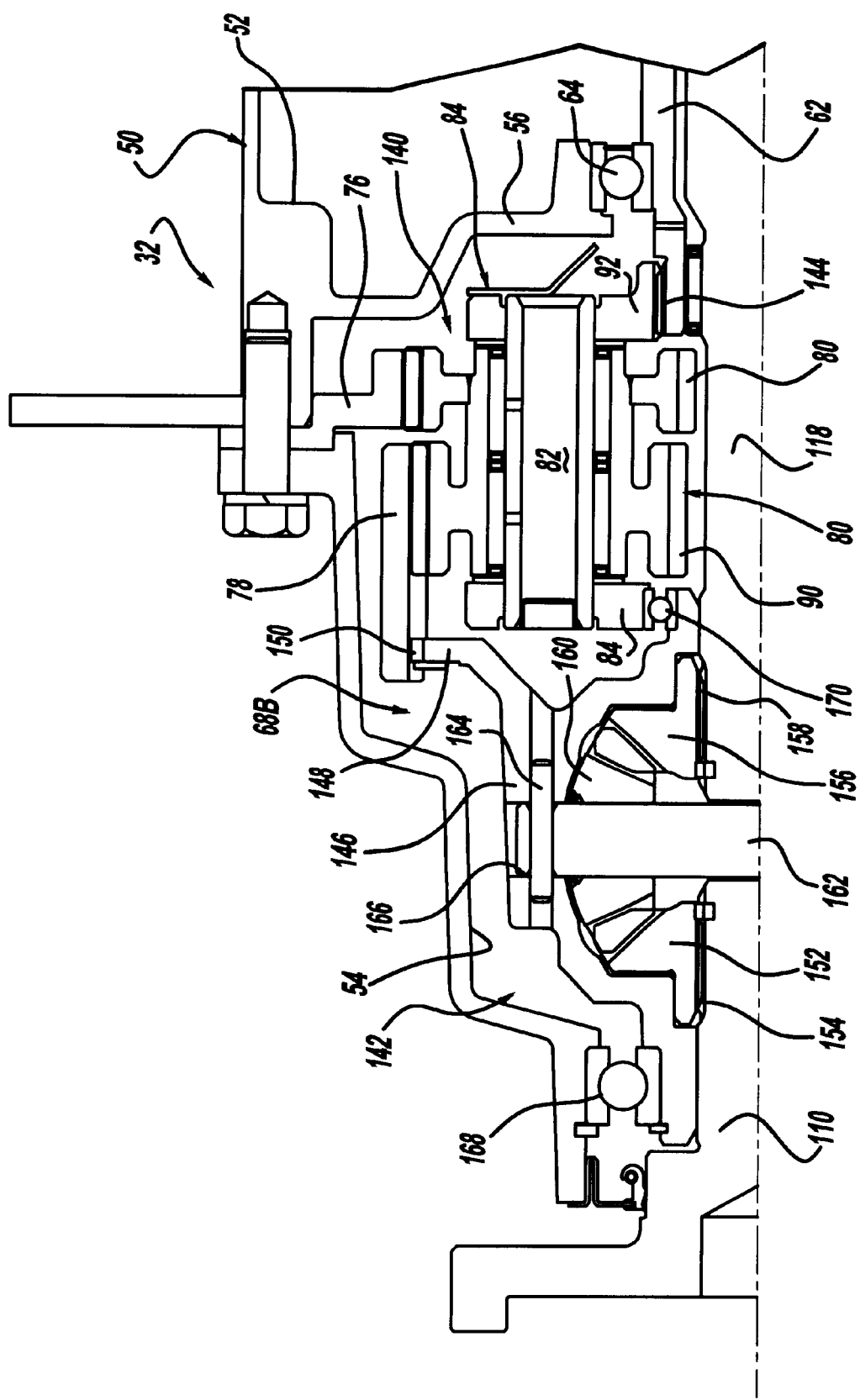
FIG. 6 is a partial sectional view of an alternative embodiment of the gearbox for use in the electric drive motor axle of the present invention.

Referring now to FIG. 6, a modified gearbox 68B for use with EDMA 32 is shown to include a reduction unit 140 and a bevel-type differential assembly 142. Reduction unit 140 is generally similar to reduction unit 70 except that sun gear 74 has been eliminated and rotor shaft 62 is now fixed via a splined connection 144 to first ring section 92 of planet carrier 84. For purposes of brevity, like components are again identified by common reference numerals. In addition, utilization of bevel differential assembly 142 permits elimination of third ring gear 100 since second ring gear 78 acts as the output of reduction unit 70 which drives the input of differential 142. In particular, the differential input is a differential casing 146 having a radial plate segment 148 fixed via a splined or lugged connection 150 to second ring gear 78. Bevel differential assembly 142 further includes a first side gear 152 fixed via a spline connection 154 to first output shaft 110, a second side gear 156 fixed via a spline connection 158 to second output shaft 118, and pinions 160 meshed with side gears 152 and 156. Pinions 160 are rotatably supported on a pinion shaft 162 secured by a retainer pin 164 in polar apertures 166 formed in casing 146. Bearing assembly 168 supports casing 146 relative to housing 50 while bearing assembly 170 supports casing 146 relative to planet carrier 84.

It should be understood that the bevel-type differential unit 142 shown in FIG. 6 can be used in combination with the planetary reduction units 70 and 70A shown in FIGS. 4 and 5. Likewise, the planetary-type differential unit 72 shown in FIGS. 4 and 5 can be used in combination with planetary reduction unit 140 shown in FIG. 6. Furthermore, equivalent components or assemblies for use as a vehicle differential can likewise be used with EDMA 32.

As noted, the hybrid powertrain system of the present invention includes two drive power sources, namely engine 16 and motor assembly 58 of EDMA 32.. Power from engine 16 is transmitted to transmission 18 (or transaxle 18A) which can be of any known type (i.e., automatic, manual, automated manual, CVT, etc.) having a forward-reverse mechanism and a gearshift mechanism. Motor assembly 58 of EDMA 32 is connected to a battery 200 and can be selectively shifted into any of a DRIVE state, a CHARGING state, and a NO-LOAD state by an electronic control system 202. In the DRIVE state, EDMA 32 functions as a motor-driven gearbox that is driven by electrical energy drawn from battery 200. In the CHARGING state, EDMA 32 functions as an electric generator for storing electric energy in battery 200. In the NO-LOAD state, motor assembly 58 is off and rotor shaft 62 is permitted to rotate freely relative to stator 60.

Figure 7:
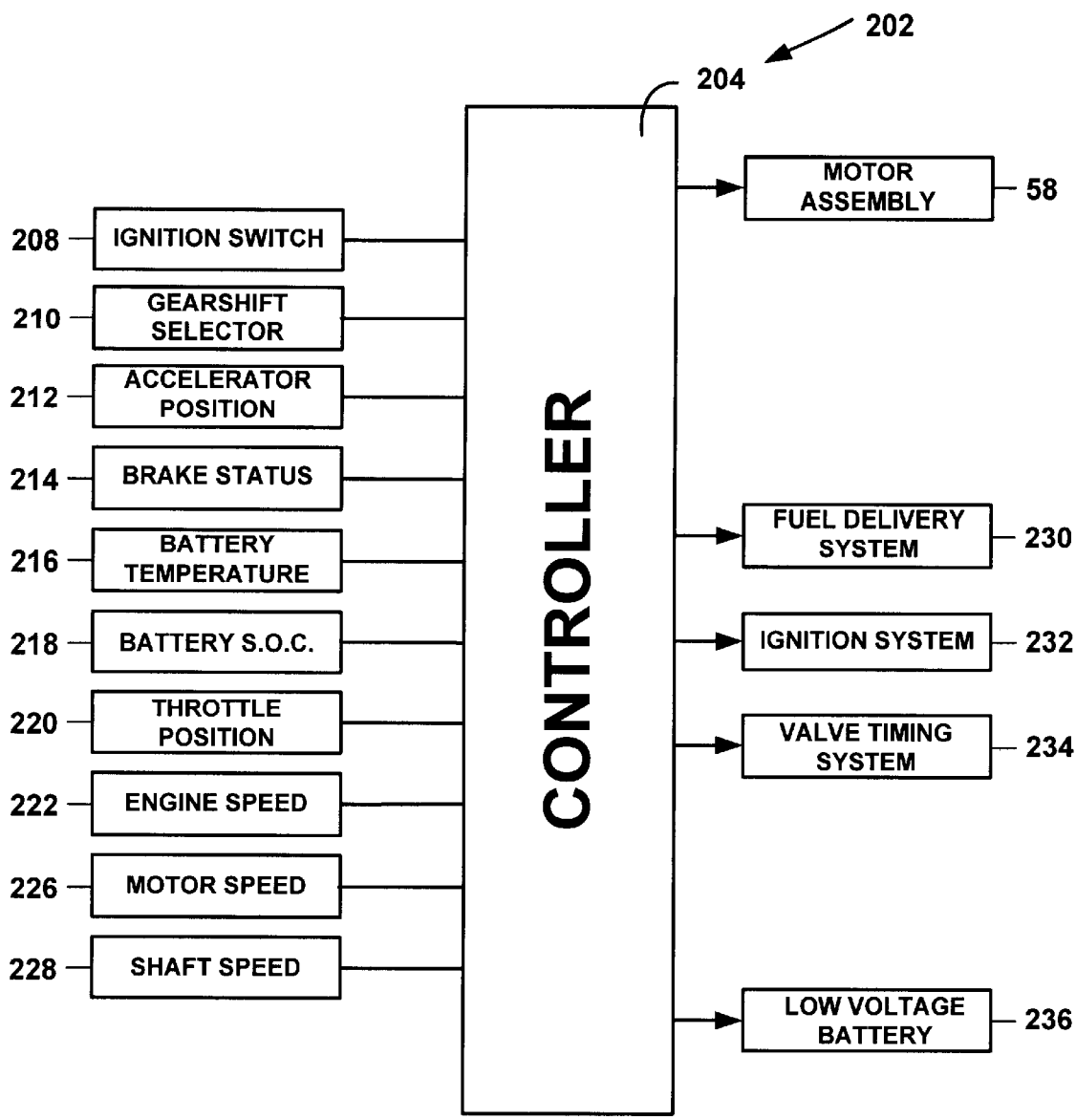
FIG. 7 is a schematic diagram of an exemplary control system associated with the hybrid powertrains of the present invention.

Control system 202 is provided for controlling operation of the hybrid powertrains shown in FIGS. 1 and 2. Referring to FIG. 7, control system 202 includes a controller 204 adapted to receive input signals from various sensors and input devices cumulatively identified in FIGS. 1 and 2 as vehicle sensors 206. Controller 204 is schematically shown in block format to be representative of an arrangement having an engine control section, a motor control sections, and a traction control section. Controller 204 is principally comprised of a microcomputer having a central processing unit (CPU), random-access memory (RAM), read-only memory (ROM), and an input-output actuator interface. Controller 204 performs data processing operations to execute various control routines according to control programs and/or maps stored in the ROM. Controller 204 receives data from an ignition switch 208, a gearshift lever switch 210, an accelerator position sensor 212, a brake status switch 214, a battery temperature sensor 216, a battery SOC (state of charge) sensor 218, and a throttle position sensor 220. In addition, other inputs include an engine speed sensor 222, a motor speed sensor 226, and a driveshaft speed sensor 228. Ignition switch 208 is closed when the vehicle key is turned on. Assuming transmission 18 is of an automatic type, then "P", "N", "R", and "D" switches in gearshift selector switch 210 are closed when the gearshift mechanism is located in its Park (P), Neutral (N), Reverse (R) and Drive (D) positions, respectively. Accelerator position sensor 212 senses the depression angle of an accelerator pedal. Brake status switch 214 is turned on when the brake pedal is depressed. Battery temperature sensor 216 senses the temperature of battery 200. Battery SOC sensor 218 senses the charge level of battery 200. Throttle position sensor 220 senses the degree of opening of the engine throttle valve. Engine speed sensor 222 senses a parameter indicative of the rotary speed of the drive shaft of engine 16. Motor speed sensor 226 senses a parameter indicative of the rotary speed of rotor 62 of motor assembly 58. Shaft speed sensor 228 senses the rotary speed of propshaft 20 and can further be used as an indication of vehicle speed.

Based on the operating information inputted to controller 204, a mode of operation of the hybrid powertrain is selected and controller 204 sends electric control signals to various power-operated control devices. Specifically, controller 204 monitors and continuously controls actuation of motor assembly 58 of EDMA 32 including the rotary speed of rotor shaft 62. Various engine management systems for controlling the speed and torque generated by engine 16 are also monitored and controlled by controller 204. These engine management systems include a fuel delivery system 230, an ignition system 232, and a valve timing system 234. A low voltage battery 236 may serve as the power supply for controller 204.

Support for the specification amendments may be found in the originally filed claims and specification. For example, the last sentence of paragraph notes that variable speed control of motor assembly 58 permits the torque delivered to the wheels to be continuously controlled.

There are four modes of operation for vehicle 10, namely: (a) an electric mode; (b) a hybrid; (c) an engine mode; and (d) a regenerative mode. In the electric mode, only motor assembly 58 provides motive power to vehicle 10. In the hybrid mode, both engine 16 and motor assembly 58 provide motive power to vehicle 10. In the engine mode, only engine 16 provides motive power to vehicle 10. In the regenerative mode, a portion of the engine power is absorbed by motor assembly 58 to charge battery 200. The transition from one mode to the next is smooth and transparent to the vehicle operator since controller 204 selects the most appropriate mode depending on various vehicle operating conditions including vehicle speed, accelerator demand and battery charge status.

In the electric mode, motor assembly 58 is shifted into its DRIVE state such that motive power is generated by EDMA 32. When shifting from the electric mode into the hybrid mode, engine 16 is started and provides motive power in conjunction with EDMA 32 to establish four-wheel drive operation. When the vehicle's operating conditions warrant operation in the engine only mode, motor assembly 58 is shifted into one of its CHARGING or NO-LOAD states. Thus, a four-wheel drive mode of operation is established when both powered drivelines are actuated and controlled. The traction control section of controller 204 is operable to control slip conditions between the front and rear wheels.

Preferred embodiments of the invention has been disclosed to provide those skilled in the art an understanding of the best mode currently contemplated for the operation and construction of the hybrid drive systems. The invention being thus described, it will be obvious that various modifications can be made without departing from the true spirit and scope of the invention, and all such modifications as would be considered by those skilled in the art are intended to be included within the scope of the following claims.

What is claimed is:

1. A drive axle for a motor vehicle, comprising:
    a housing;
    an electric motor disposed in said housing and having a rotor shaft; and
    a gearbox disposed in said housing and operably coupling said rotor shaft to first and second output shafts, said gearbox including a reduction unit having a first ring gear fixed to said housing, a second ring gear, a planet carrier driven by said rotor shaft, and a planet gear rotatably supported by said planet carrier and having a first gear segment meshed with said first ring gear and a second gear segment meshed with said second ring gear, said gearbox further including a differential assembly having an input member driven by said second ring gear, a first output member driving said first output shaft, and a second output member driving said second output shaft.

2. The drive axle of claim 1 wherein said rotor shaft is tubular and is rotatably supported on said second output shaft.

3. The drive axle of claim 1 wherein said differential assembly is a bevel gearset having a differential casing fixed for rotation with said second ring gear, a first side gear fixed for rotation with said first output shaft, a second side gear fixed for rotation with said second output shaft, and pinions rotatably supported by said casing and meshed with said first and second side gears.

4. The drive axle of claim 1 wherein said differential assembly is a planetary gearset having a third ring gear fixed for rotation with said second ring gear, an output sun gear fixed for rotation with said first output shaft, an output carrier fixed for rotation with said second output shaft, a first pinion rotatably supported by said output carrier and meshed with said third ring gear, and a second pinion rotatably supported by said output carrier and meshed with said first pinion and said output sun gear.

5. The drive axle of claim 1 wherein said first and second output shafts are adapted for connection to a pair of first wheels to deliver drive torque thereto in response to actuation of said electric motor.

6. A hybrid motor vehicle, comprising:
    a first powered driveline including an engine operable for driving a first pair of wheels; and
    a second powered driveline including a drive axle operable for driving a second pair of wheels, said drive axle including a housing, an electric motor located in said housing and having a rotor shaft, and a gearbox located in said housing and having a reduction gearset and a differential, said reduction gearset having a planet carrier driven by said rotor shaft, a first ring gear fixed to said housing, a second ring gear and a planet gear supported by said planet carrier and having a first gear segment meshed with said first ring gear and a second gear segment meshed with said second ring gear, said differential having an input member driven by said second ring gear and first and second output members driving said second pair of wheels.

7. The hybrid motor vehicle of claim 6 wherein said drive axle further includes a first output shaft coupled to said first output member and a second output shaft coupled to said second output member, and wherein said rotor shaft is tubular and rotatably supported on said second output shaft.

8. The hybrid motor vehicle of claim 7 wherein said differential is a bevel gearset having a casing fixed for rotation with said second ring gear, a first side gear fixed for rotation with said first output shaft, a second side gear fixed for rotation with said second output shaft, and pinions rotatably supported by said casing and meshed with said first and second side gears.

9. The hybrid motor vehicle of claim 7 wherein said differential is a planetary gearset having a third ring gear fixed for rotation with said second ring gear, an output sun gear fixed for rotation with said first output shaft, an output carrier fixed for rotation with said second output shaft, a first pinion rotatably supported by said output carrier and meshed with said third ring gear, and a second pinion supported by said output carrier and meshed with said first pinion and said output sun gear.

10. The hybrid motor vehicle of claim 6 further comprising:
    vehicle sensors for detecting operating characteristics of the motor vehicle and generating sensor signals; and
    a controller for generating electrical control signals in response to said sensor signals said control signals being delivered to said motor assembly for controlling the rotary speed of said rotor shaft.

11. An electrically-powered drive axle for driving a pair of wheels in a motor vehicle, comprising:
    a housing;
    first and second output shafts rotatably supported by said housing and adapted for connection to the pair of wheels;
    an electric motor disposed in said housing and having a rotor shaft; and
    a gearbox disposed in said housing and including a reduction gearset and a differential assembly, said reduction gearset having a first ring gear fixed to said housing, a second ring gear, a carrier driven by said rotor shaft, and compound gears rotatably supported by said carrier and having a first gear segment fixed to a second gear segment, said first gear segment is meshed with said first ring gear and said second gear segment is meshed with said second ring gear, said differential assembly having an input member driven by said second ring gear, a first output member driving said first output shaft, and a second output member driving said second output shaft.

12. The drive axle of claim 11 wherein said rotor shaft is tubular and is rotatably supported on said second output shaft.

13. The drive axle of claim 11 wherein said differential assembly is a bevel gearset having a differential casing fixed for rotation with said second ring gear, a first side gear fixed for rotation with said first output shaft, a second side gear fixed for rotation with said second output shaft, and pinions rotatably supported by said casing and meshed with said first and second side gears.

14. The drive axle of claim 11 wherein said differential assembly is a planetary gearset having a third ring gear fixed for rotation with said second ring gear, an output sun gear fixed for rotation with said first output shaft, an output carrier fixed for rotation with said second output shaft, a first pinion rotatably supported by said output carrier and meshed with said third ring gear, and a second pinion rotatably supported by said output carrier and meshed with said first pinion and said output sun gear.

15. The drive axle of claim 11 wherein said first and second output shafts are adapted for connection to a pair of first wheels to deliver drive torque thereto in response to actuation of said electric motor.

16. The hybrid motor vehicle of claim 11 further comprising:
vehicle sensors for detecting operating characteristics of the motor vehicle and generating sensor signals; and
a controller for generating electrical control signals in response to said sensor signals, said control signals being delivered to said electric motor for controlling the rotary speed of said rotor shaft.

17. The drive axle of claim 11 wherein said first and second output shafts are adapted for connection to a pair of front wheels to deliver drive torque thereto in response to actuation of said electric motor, and wherein the motor vehicle has rear wheels driven by power from an engine.

18. The drive axle of claim 11 wherein said first and second output shafts are adapted for connection to a pair of rear wheels to deliver drive torque thereto in response to actuation of said electric motor, and wherein the motor vehicle has front wheels driven by power from an engine.

19. A hybrid motor vehicle, comprising:
a first powered driveline including an engine operable for driving a first pair of wheels; and
a second powered driveline having a drive axle operable for driving a second pair of wheels, said drive axle including an electric motor having a rotor shaft and a gearbox having a reduction gearset and a differential assembly, said reduction gearset including a fixed first ring gear, a rotatable second ring gear, a planet carrier coupled to said rotor shaft, and compound planet gears each having a first gear segment meshed with said first ring gear and which is fixed to a second gear segment that is meshed with said second ring gear, said differential assembly having an input member driven by said second ring gear and first and second output members driving said second pair of wheels.

20. The hybrid vehicle of claim 19 wherein said drive axle further includes a first output shaft coupled to said first output member and a second output shaft coupled to said second output member, and wherein said rotor shaft is tubular and rotatably supported on said second output shaft.

21. The hybrid motor vehicle of claim 19 wherein said differential is a bevel gearset having a casing fixed for rotation with said second ring gear, a first side gear fixed for rotation with said first output shaft, a second side gear fixed for rotation with said second output shaft, and pinions rotatably supported by said casing and meshed with said first and second side gears.

22. The hybrid motor vehicle of claim 20 wherein said differential is a planetary gearset having a third ring gear fixed for rotation with said second ring gear, an output sun gear fixed for rotation with said first output shaft, an output carrier fixed for rotation with said second output shaft, a first pinion rotatably supported by said output carrier and meshed with said third ring gear, and a second pinion supported by said output carrier and meshed with said first pinion and said output sun gear.

23. The hybrid motor vehicle of claim 19 further comprising:
vehicle sensors for detecting operating characteristics of the motor vehicle and generating sensor signals; and
a controller for generating electrical control signals in response to said sensor signals, said control signals being delivered to said electric motor for controlling the rotary speed of said rotor shaft.

24. A hybrid motor vehicle, comprising:
a first powered driveline including an engine operable for driving a first pair of wheels; and
a second powered driveline having a drive axle operable for driving a second pair of wheels, said drive axle including an electric motor having a rotor shaft, first and second output shafts driving said second pair of wheels, and a gearbox having a reduction gearset and a differential assembly, said reduction gearset including a fixed first ring gear, a rotatable second ring gear, a planet carrier coupled to said rotor shaft, and compound planet gears each having a first gear segment meshed with said first ring gear and which is fixed to a second gear segment that is meshed with said second ring gear, said differential assembly having an input member driven by said second ring gear and first and second output members, respectively driving said first and second output shafts.

25. The hybrid vehicle of claim 24 wherein said rotor shaft is tubular and rotatably supported on said second output shaft.

26. The hybrid motor vehicle of claim 24 wherein said differential is a bevel gearset having a casing fixed for rotation with said second ring gear, a first side gear fixed for rotation with said first output shaft, a second side gear fixed for rotation with said second output shaft, and pinions rotatably supported by said casing and meshed with said first and second side gears.

27. The hybrid motor vehicle of claim 24 wherein said differential is a planetary gearset having a third ring gear fixed for rotation with said second ring gear, an output sun gear fixed for rotation with said first output shaft, an output carrier fixed for rotation with said second output shaft, a first pinion rotatably supported by said output carrier and meshed with said third ring gear, and a second pinion supported by said output carrier and meshed with said first pinion and said output sun gear.

* * * * *